United States Patent
Hong

(10) Patent No.: US 8,738,097 B2
(45) Date of Patent: May 27, 2014

(54) WATERPROOFING METHOD AND STRUCTURE FOR MOBILE PHONE

(75) Inventor: Seung-Mo Hong, Seoul (KR)

(73) Assignee: Tyco Electronics Amp Korea Ltd., Kyungsangbuk-do (KR)

( * ) Notice: Subject to any disclaimer, the term of this patent is extended or adjusted under 35 U.S.C. 154(b) by 550 days.

(21) Appl. No.: 12/360,625

(22) Filed: Jan. 27, 2009

(65) Prior Publication Data

US 2009/0191927 A1 Jul. 30, 2009

(30) Foreign Application Priority Data

Jan. 28, 2008 (KR) .................. 10-2008-0008678
Aug. 8, 2008 (KR) .................. 10-2008-0078094

(51) Int. Cl.
*H04W 88/02* (2009.01)
(52) U.S. Cl.
USPC ............... 455/575.1; 455/575.2; 455/575.3; 455/575.4
(58) Field of Classification Search
USPC .......................................... 455/575.1–575.8
See application file for complete search history.

(56) References Cited

U.S. PATENT DOCUMENTS

| | | | |
|---|---|---|---|
| 5,807,126 A | 9/1998 | Bethurum | |
| 6,302,713 B1 * | 10/2001 | Lai | 439/131 |
| 6,619,984 B2 * | 9/2003 | Liu | 439/607.4 |
| 6,872,092 B2 * | 3/2005 | Oka | 439/587 |
| 7,010,326 B2 * | 3/2006 | Mori et al. | 455/557 |
| 7,419,385 B2 | 9/2008 | Itou et al. | |
| 2002/0115344 A1 | 8/2002 | Chen | |
| 2002/0119697 A1 | 8/2002 | Chan | |
| 2002/0146937 A1 * | 10/2002 | Yi-Tsung | 439/587 |
| 2007/0015393 A1 * | 1/2007 | He et al. | 439/271 |

OTHER PUBLICATIONS

European Search Report dated Aug. 4, 2011, Application No. 09151049.5-1246 / 2083555, Applicant Tyco Electronics AMP Korea Limited, 7 pages.

* cited by examiner

*Primary Examiner* — Patrick Edouard
*Assistant Examiner* — Julio Perez
(74) *Attorney, Agent, or Firm* — Barley Snyder

(57) ABSTRACT

A structure and a method for waterproofing a mobile phone are disclosed, to prevent entry of water through a recharging connector of the mobile phone such that an internal circuit in a main body is not damaged by water. The waterproofing method includes a housing molding process wherein a housing is insert-molded to have a contact terminal and a ground terminal, a groove for connection with a sealing member, and a mounting hole for mounting to a PCB, a sealing member assembling process wherein the housing, a shell, and the sealing member are assembled into an assembly, a connector assembling process wherein the assembly is mounted to the PCB so that the terminals of the housing contact a connection terminal of a PCB connector, and a casing assembling process wherein upper and lower casings are connected to the sealing member.

4 Claims, 19 Drawing Sheets

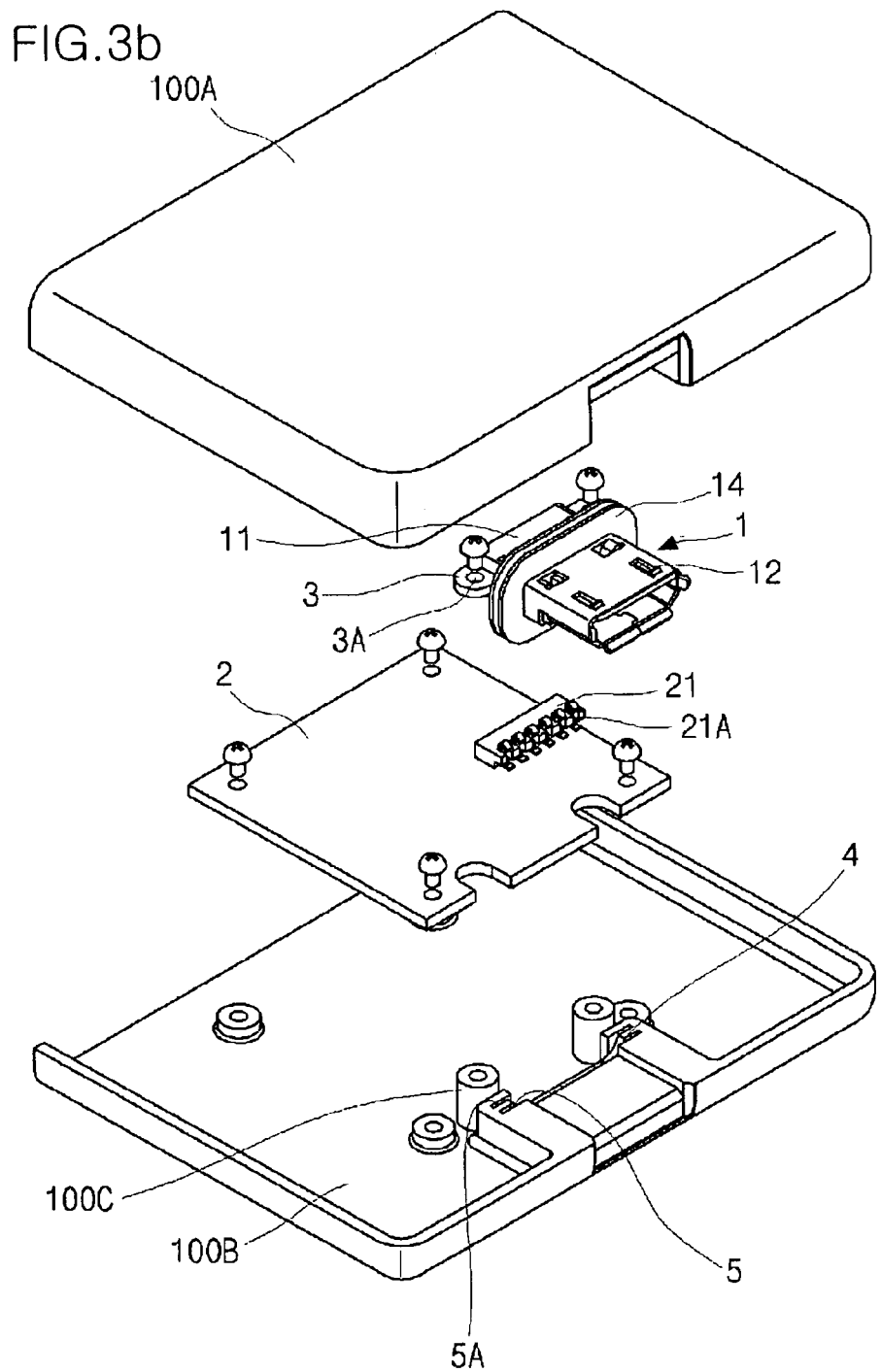

WATERPROOFING METHOD AND STRUCTURE FOR MOBILE PHONE

CROSS-REFERENCE TO RELATED APPLICATIONS

This application claims the benefit of the filing date under 35 U.S.C. §119(a)-(d) of Korean Patent Application No. 10-2008-0008678, filed Jan. 28, 2008, and Korean Patent Application No. 10-2008-0078094, filed Aug. 8, 2008.

FIELD OF THE INVENTION

The present invention relates to a method and a structure for waterproofing a mobile phone, and more particularly to waterproofing method and structure for a mobile phone, capable of preventing damage to an internal circuit mounted in a main body of the mobile phone, by providing the mobile phone with a waterproof function to eliminate damage caused when water enters through a recharging connector.

BACKGROUND

In general, as shown in FIG. 1A, a mobile phone includes a main body comprising upper and lower casings 100A and 100B, which are separable, and a recharging connector 200 mounted to the main body. By having a cover 300, the recharging connector 200 is capable of preventing entry of water, as well as dust and other foreign substances. Such a cover 300 is connected by a link shaft 300A, made of an elastic material, to the main body in order to maintain connection with the main body even when the recharging connector is opened.

The cover 300, however, is mainly provided for the dust-proof function and does not work well as a waterproof function. Therefore, in situations where the mobile phone is submerged in water, entry of water into the main body of the mobile phone is not effectively prevented, even while the cover 300 is blocking the recharging connector 200. Therefore, entering water can seriously affect the performance of the mobile phone.

To be more specific, as shown in FIG. 1B, the recharging connector 200 includes a housing 11 having therein a plurality of contact terminals 13 formed by insert injection molding and a metal shell 12 that is connected at the outside of the housing 11, thereby constituting a connector assembly 1. The shell 12 includes a pair of fixing holes 121 at an upper part thereof in order to engage hooks of the recharging connector 200. A ground terminal 123 and the contact terminals 13 of the shell 12 are electrically connected to a printed circuit board (PCB) 200A through soldering. Upper parts of the contact terminals 13 are supported by a supporting protrusion 114 projecting to the front of the housing 11.

That is, while a leading end of the contact terminal 13 is inclined upward, a rear end of a horizontally extended part of the contact terminal 13 is bent downward, perpendicularly as to be soldered to the PCB 200A. Here, the soldering is performed using a surface mount device (SMD) type.

According to the SMD soldering, a solder paste 200B, consisting of small gel particles, is interposed between patterns formed on the PCB 200A and the contact terminals 13. Subsequently, heat is applied to melt the solder paste 200B in a chamber such that the patterns and the contact terminals are soldered to each other. Here, the solder paste 200B can be attached to the PCB patterns and the contact terminals 13 through a predetermined viscosity.

More specifically, according to the SMD soldering, the recharging connector 200 is constituted in such a manner that the connector assembly 1 is first placed on the PCB 200A and the ground terminal 123 of the shell 12 is soldered to the PCB 200A. Next, the solder paste 200B is interposed between pattern-type connection terminals (not shown) formed at the PCB 200A and the contact terminals 13 constituting the connector assembly 1, and then heated in the chamber. Accordingly, the solder paste 200B is melt between the connection terminals and the contact terminals 13, thus accomplishing the soldering.

The above-structured recharging connector 200 has a problem in that water can permeate gaps between the shell 12 and the upper and lower casings 100A and 100B, as indicated by arrows in FIG. 1B. Additionally, water may permeate through the fixing holes 121 formed at the upper part of the shell 12, as well as gaps between the housing 11 and the shell 12. As the water enters the PCB 200A, the operation of the mobile phone would be seriously affected.

In order to prevent such water damage to the mobile phone, a sealing member made of rubber may be used. However, the sealing member may become deformed or damaged during assembly of the mobile phone.

More specifically, when electrically connecting the contact terminals 13 of the connector assembly 1 to the PCB 200A, the SMD soldering method is used as explained above, in which the solder paste 200B, interposed between the PCB patterns and the contact terminals 13, is melted in the chamber, thereby achieving the soldering. Therefore, the rubber sealing may be deformed or damaged by heat. Thus, rubber sealing may be improper for practical use.

The shell 12 has a grounding function in order to interrupt electromagnetic waves, generated from the inside and outside thereof. Therefore, the ground terminal 123 disposed at the lower part of the shell 12 and soldered to the PCB 200A is an essential element for grounding and fixing of the shell 12. Nevertheless, the ground terminal 123 in addition becomes a hindrance against waterproofing of the recharging connector 200.

Usually, water enters into the main body of the mobile phone through the fixing holes 121, which are formed at the upper part of the shell 12. To this end, when the sealing member is applied, it is disposed behind the fixing holes 121 of the shell 12. Since the ground terminal 123 of the shell 12 that is electrically connected to the PCB 200A is disposed ahead of the sealing member, the circuit structure may become severely damaged through the ground terminal 123 in spite of provision of the sealing member.

Furthermore, since a lower surface of the shell 12 is in contact with the ground terminal 123 through the whole length thereof as shown in FIG. 2, water may enter through the contacting area despite the use of the sealing member. Thus, the actual waterproofing is hard to accomplish.

SUMMARY

Therefore, the present invention has been made in view of the above problems, and it is an object of the present invention to provide a method and a structure for waterproofing a mobile phone. Such a method and structure would be capable of preventing damage by water to an internal circuit mounted in a main body of the mobile phone if submerged in water, specifically by providing a waterproof function that prevents damage from water entering through a recharging connector.

BRIEF DESCRIPTION OF THE DRAWINGS

The above and other objects, features and other advantages of the present invention will be more clearly understood from the following detailed description taken in conjunction with the accompanying drawings, in which:

Among FIG. 2 to FIG. 4B illustrating a waterproofing structure for a mobile phone, according to a first embodiment of the present invention.

FIG. 3A and FIG. 3B are front and rear perspective views, respectively, showing an assembled state of the connector assembly shown in FIG. 2;

FIG. 4A is a sectional view showing a connection state of a contact terminal;

FIG. 4B is a sectional view showing an inserted state of a ground terminal;

Among FIG. 5 to FIG. 7B illustrating a waterproofing structure for a mobile phone according to a second embodiment of the present invention.

FIG. 7A is a sectional view showing a connection state of a contact terminal;

FIG. 7B is a sectional view showing an inserted state of a ground terminal;

FIG. 8 to FIG. 12 illustrate a waterproofing structure for a mobile phone according to a third embodiment of the present invention;

FIG. 8 is an exploded view of a connector assembly;

FIG. 9 is a perspective view showing an assembled state of the connector assembly;

FIG. 10 is an exploded perspective view showing the structure of a main body of the mobile phone;

FIG. 12 is a sectional view showing a constructed state of the waterproof structure according to the third embodiment of the present invention.

DETAILED DESCRIPTION OF THE EMBODIMENT(S)

Figure 1A:
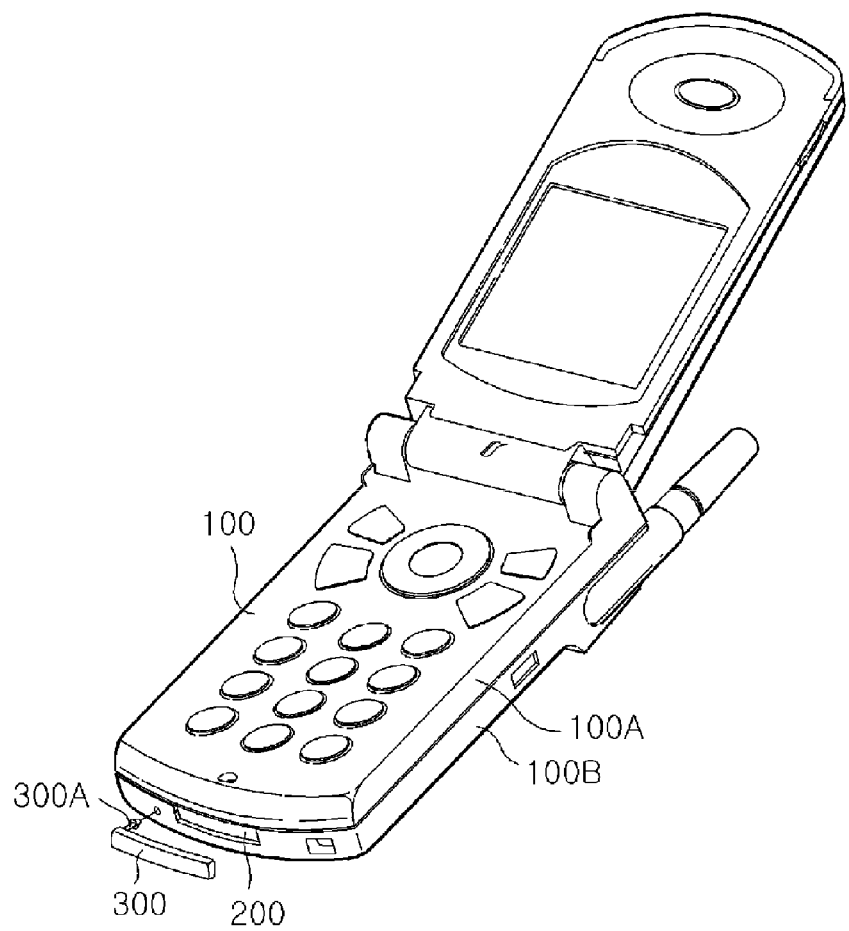
FIG. 1A and FIG. 1B are a perspective view and a sectional view showing a connector cover structure of a mobile phone according to a conventional art.
Figure 1B:
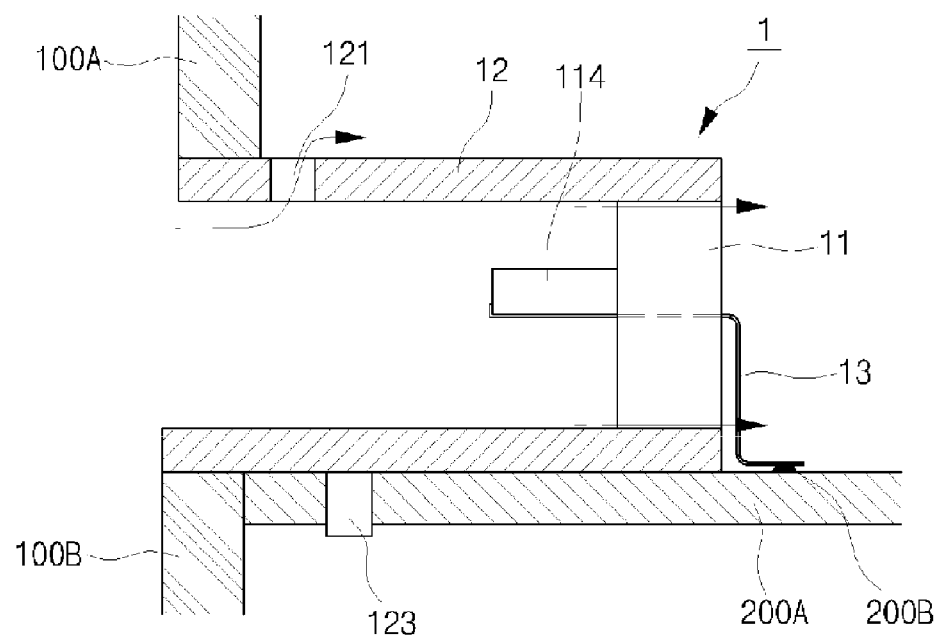

Hereinafter, exemplary embodiments of the present invention will be described in detail with reference to the accompanying drawings. It is noted that various modified configurations of the embodiment can be included in the scope of the present invention. The following description is provided to explain the present invention more specifically. Therefore, respective elements of the embodiment may be exaggerated in the drawings.

Figure 2:
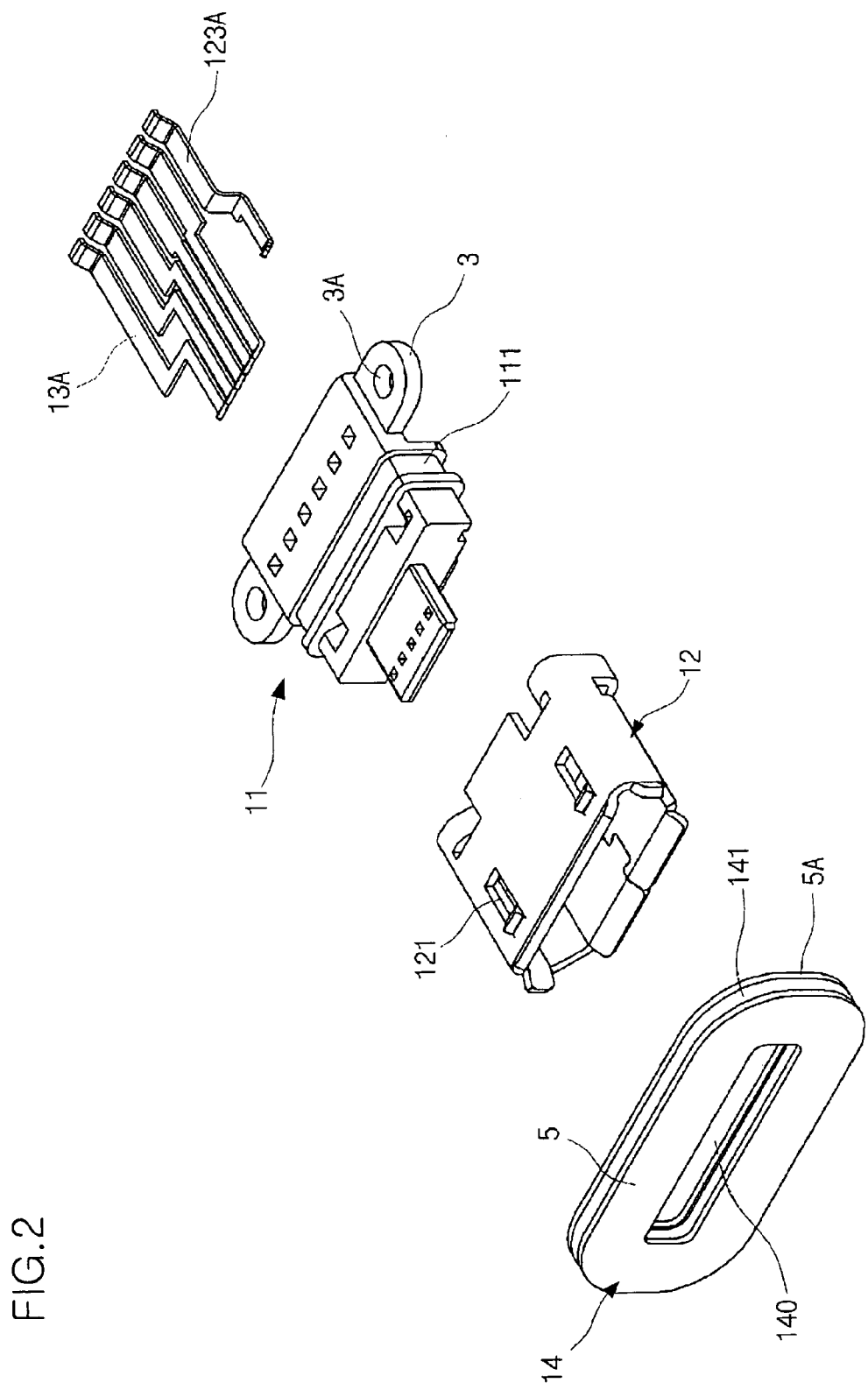
FIG. 2 is an exploded perspective view of a connector assembly.
Figure 3A:
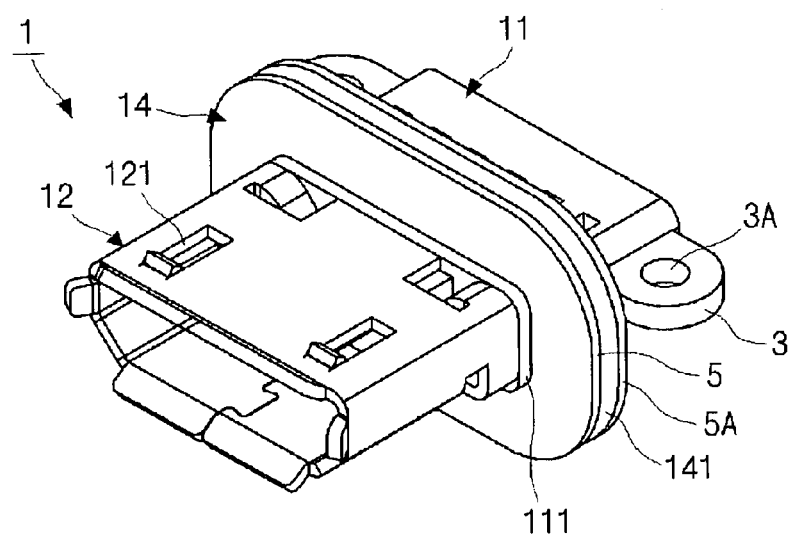

Referring first to FIG. 2 through FIG. 4, these figures illustrate a waterproof structure for a mobile phone according to a first embodiment of the present invention, a recharging connector of the mobile phone having a housing 11 made of resin, including a contact terminal 13 integrally formed by injection molding, and a shell 12 connected to the front of the housing 11, thereby constituting a connector assembly 1.

In the above structured recharging connector, and according to the first embodiment of the present invention, a sealing member 14 is mounted at the outside of the housing 11, as shown in FIG. 2. Therefore, as upper and lower casings 100A and 100B are assembled into a main body of the phone, the upper and lower casings 100A and 100B are connected with the sealing member 14, closely surrounding the outside of the sealing member 14 as shown in FIG. 3B.

For this structure, the housing 11 includes a sealing member-receiving groove 111 for mounting the sealing member 14 therein, as shown in FIG. 2. The sealing member 14 includes a penetration hole 140 corresponding to the sealing member-receiving groove 111 of the housing 11, and an airtight groove portion 141 formed along an outer circumference thereof, in order to insert and connect the upper and lower casings 100A and 100B with the housing 11. A front protrusion 142 and a rear protrusion 142A of the sealing member 14 are defined by the airtight groove portion 141.

Referring to FIG. 3B, a pair of airtight protrusions 4, each formed at the upper casing 100A and the lower casing 100B and corresponding to each other, are closely inserted in the airtight groove portion 141 of the sealing member 14. At the front and the rear of each airtight protrusion 4, front and rear recesses 5 and 5A are formed to respectively insert the front protrusion 142 and the rear protrusion 142A.

Figure 4A:
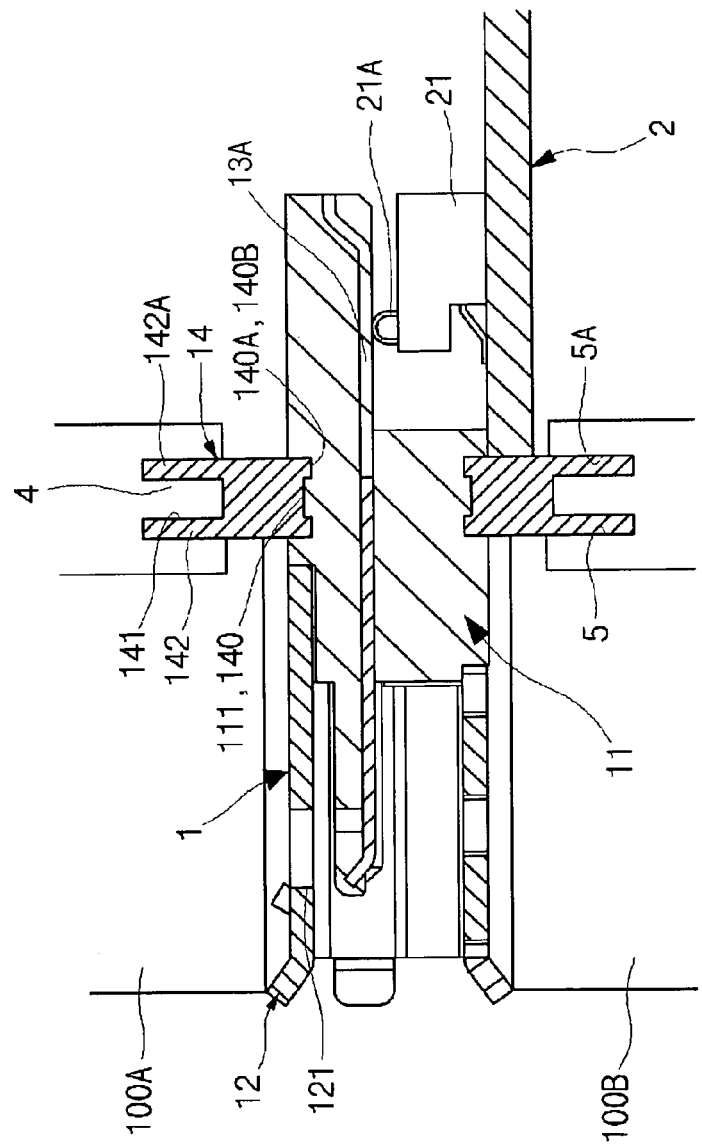
FIG. 4A and FIG. 4B show the assembled state of the connector assembly of FIG. 2.

In addition, through connection between a recess 140A and a protrusion 140B formed on an inside of the penetration hole 140 of the sealing member 14, the sealing member-receiving groove 111 can provide an airtight connection with the penetration hole 140 of the sealing member 14 (as shown in FIG. 4A).

The shell 12 includes the pair of fixing holes 121 at the upper part, in order to engage hooks of a connector (not shown) of the recharging connector. In a situation where the phone submerges in water, water would enter through the fixing holes 121, the housing 11 and the gap between the upper and lower casings 100A and 100B, permeating up to the inside of a printed circuit board (PCB) mounted in the main body, thereby causing serious damage to the circuit structure of the mobile phone.

However, when the airtight structure is achieved through assembly of the sealing member 14 and the upper and lower casings 100A and 100B, the water that entered in the recharging connector 200 can be prevented from further entering into the main body through the fixing holes 121 of the sealing member 14.

The present invention is also characterized in that the contact terminal 13 of the recharging connector 200 can be connected to the PCB without requiring a soldering process. For this reason, referring to FIG. 3B, a PCB connector 21 is provided to the PCB 2. The PCB connector 21 includes a plurality of pressure-type connection terminals 21A, one ends of which are curved in an arc shape to have elasticity in up and down directions, as shown in FIG. 4A.

With the above structure, the connector assembly 1 is constructed in such a way that fastening holes 3A, formed at both sides of the housing 11, corresponds to a fixing boss 100C that is formed on the lower casing 100B and then fastened together with the PCB using screws, as shown in FIG. 3B.

Figure 4B:
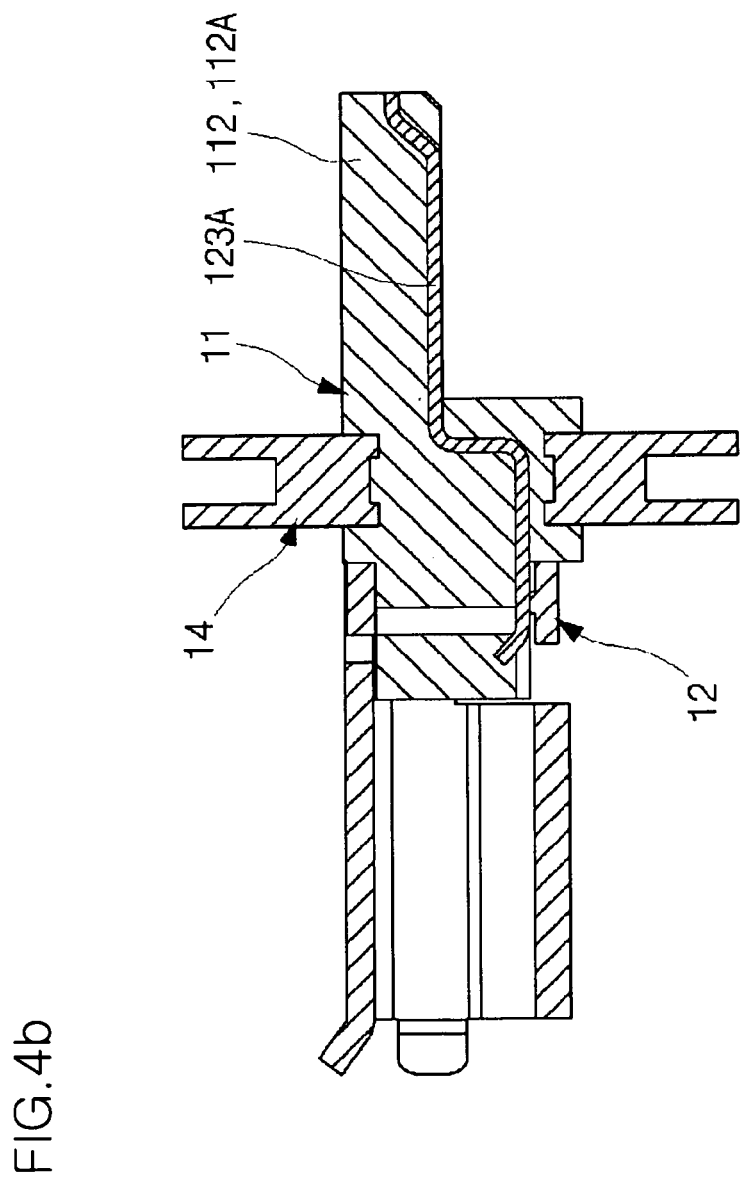

As the connector assembly 1 is constructed, the pressure-type connection terminal 21A of the PCB connector 21 is compressed by a contact terminal 13A and a ground terminal 123A, as shown in FIG. 4A, thereby achieving connection between the connection terminal 21A and the terminals 13A and 123A. The ground terminal 123A is insert-molded into the housing 11, prior to connector assembly 1 construction. Therefore, a leading end of the ground terminal 123A is endowed with a grounding function through contact with a lower inner surface of the shell 12, as shown in FIG. 4B. Moreover, since the ground terminal 123A is insert-molded into the housing 11, the water existing in the connector is prevented from entering into the PCB 2 by the housing 11.

The waterproofing structure according to the first embodiment of the present invention is capable of obtaining the waterproof function through the following processes, which will be explained in detail hereinafter with reference to the accompanying drawings.

(Process 1)

In this process, the sealing member 14 having the airtight groove portion 141 along the outer circumference is fitted with the outside of the housing 11, which is connected with the shell 12 at the front, and inserted with the contact terminal 13A and the ground terminal 123A, thereby constituting the connector assembly 1. More particularly, the housing 11, connected with the shell 12, is inserted into the penetration hole 140 of the sealing member 14, and the sealing member 14 is fit with the sealing member-receiving groove 111 of the housing 11.

(Process 2)

The PCB 2, equipped with the PCB connector 21 on the upper surface thereof, is fastened to the lower casing 100B using bolts, as shown in FIG. 3B. The PCB connector 21 includes the pressure-type connection terminal 21A.

(Process 3)

In the third process, the connector assembly 1 is connected with the lower casing 100B. For this, the airtight protrusion 4 of the lower casing 100B is inserted into the airtight groove portion 141 of the sealing member 14, which is connected to the housing 11. The front and rear protrusions 142 and 142A of the sealing member 14 are inserted respectively in the front and rear recesses 5 and 5A, which are formed at the lower casing 100B.

Next, the housing 11 is fastened to the fixing boss 100C of the lower casing 100B through the fastening hole 3A that is formed in the mounting part 3 of the housing 11. At this time, the contact terminal 13A and the ground terminal 123A, formed in the housing 11, are brought into contact with the pressure-type connection terminal 21A of the PCB connector 21 of the PCB 2, as shown in FIG. 3B and FIG. 4B.

(Process 4)

In the fourth process, the upper casing 100A and the lower casing 100B are connected to each other. In the same manner as the third process, the airtight protrusion 4 of the upper casing 100A is inserted in the airtight groove portion 141 of the sealing member 14, which is connected to the housing 11. Additionally, the front and rear protrusions 142 and 142A of the sealing member 14 are inserted respectively in the front and rear recesses 5 and 5A formed at the upper casing 100A. In this state, the upper and lower casings 100A and 100B are connected to each other as shown in FIG. 3B and FIG. 4B.

Figure 5:
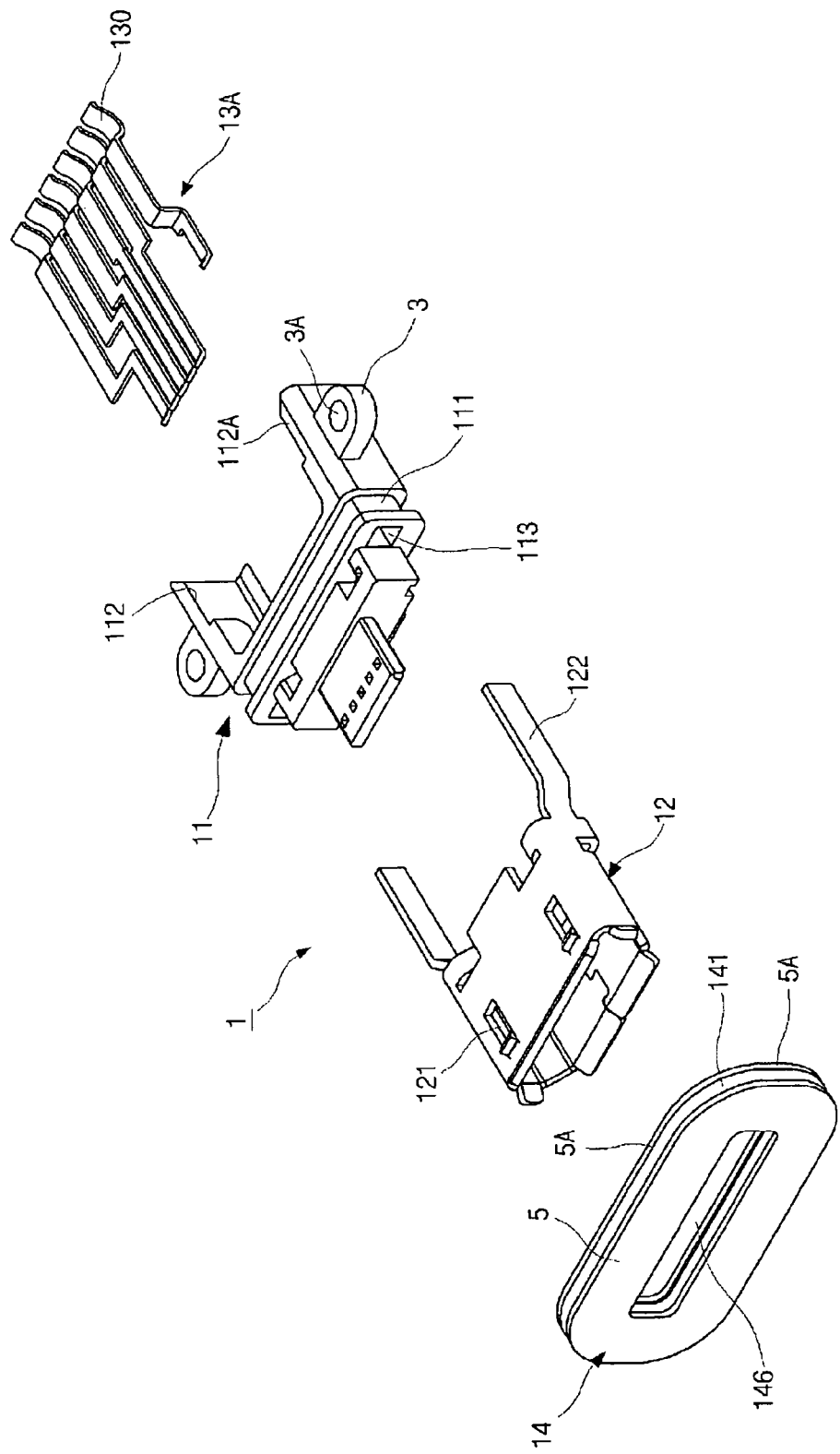
FIG. 5 is an exploded view of a connector assembly.

FIGS. 5 through 7B illustrate a waterproofing structure according to the second embodiment of the present invention. FIG. 5 is an exploded perspective view showing the connector assembly 1.

Figure 7A:
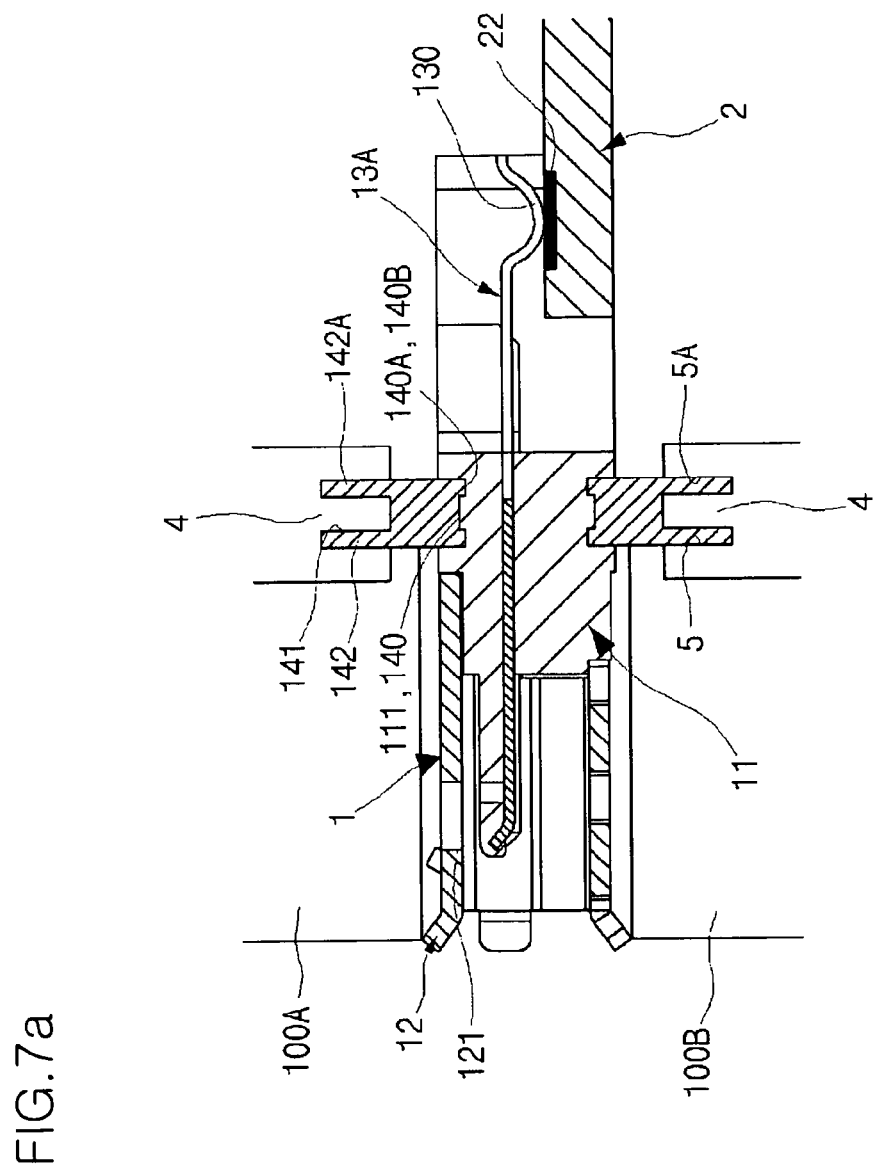
FIG. 7A and FIG. 7B show the assembled state of the connector assembly of FIG. 5.

In this embodiment, as shown in FIG. 7A, when the connector assembly 1 is mounted to the PCB, the connector assembly 1 is guided to a mounting position at the PCB in a sliding manner. Even in a case where the connection terminal of the PCB is simply formed as a pattern on the PCB rather than as a separate part, the contact terminal 13A and the ground terminal 123A, constituting the connector assembly 1, can be brought into close contact with the pattern-type connection terminal 22.

For this purpose, as shown in FIG. 5, a pair of housing legs 112 and 112A are formed on both sides of the housing 11 to be directed backward. In addition, the housing legs 112 and 112A are guided to the mounting position of the PCB 2 by cut slits 23A and 23B, as shown in FIG. 6B.

Consequently, convenience and efficiency in the assembling process can be improved. In addition, the housing legs 112 and 112A are supported by reinforcing pieces 122 that are formed at both sides of the shell 12 and inserted in mounting holes 113 of the housing 11, such that strength of the housing legs 112 and 112A can be reinforced.

Figure 6A:
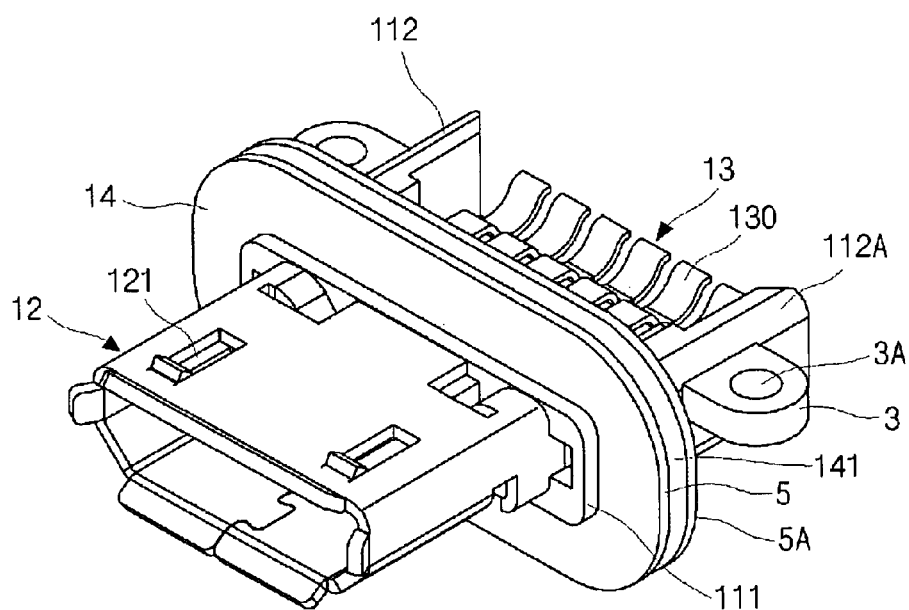
FIG. 6A and FIG. 6B are front and rear perspective views, respectively, showing an assembled state of the connector assembly shown in FIG. 5.
Figure 6B:
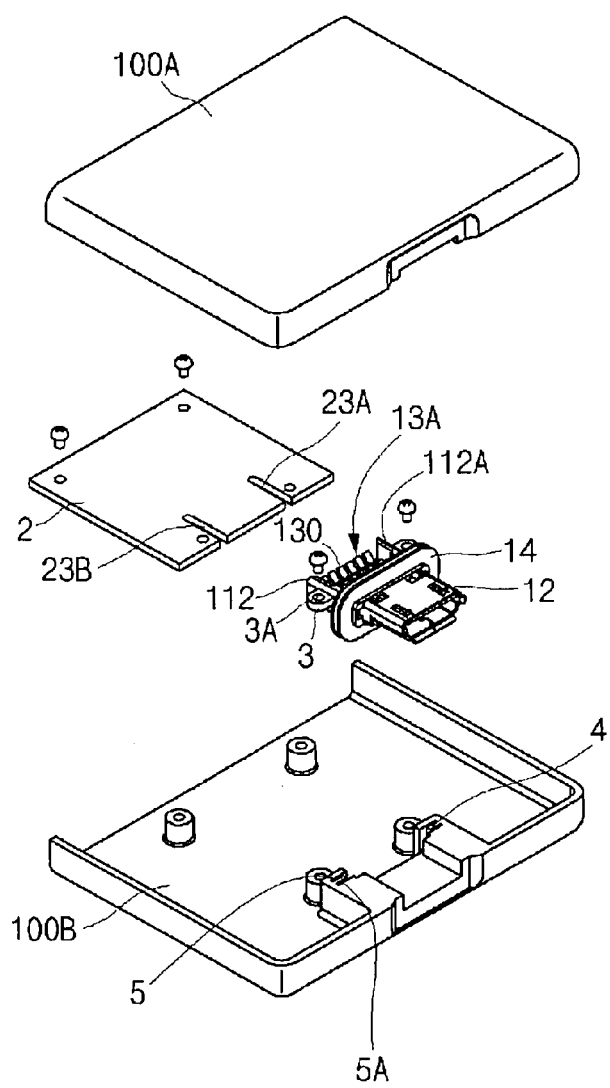

Furthermore, as shown in FIG. 5 and FIG. 6A, the rear end of the contact terminal 13 is configured as an elastic supporting part 130, in the form of a resilient spring that is curved downward, so that elasticity is exerted downward. Accordingly, close contact and connection between the contact terminal 13A of the recharging connector and the pattern-type connection terminal 22 of the PCB 2 can be achieved without having to providing a dedicated connector to the PCB 2. The technical features related to the grounding will not be repeatedly explained in detail (refer to FIG. 7A and FIG. 7B).

The structure according to the second embodiment is capable of obtaining the waterproof function through the following processes, which will be described in detail hereinafter with reference to the accompanying drawings.

(Process 1)

In the first process, the sealing member 14, having the airtight groove portion 141 along the outer circumference, is fit with the outside of the housing 11. The housing 11 is connected with the shell 12 at the front and inserted with the contact terminal 13A and the ground terminal 123A, thereby constituting the connector assembly 1. More particularly, the housing 11, connected with the shell 12, is inserted in the penetration hole 140 of the sealing member 14, and the sealing member 14 is fit in the sealing member-receiving groove 111 of the housing 11. Additionally, the reinforcing pieces 122 of the shell 12 are inserted in the mounting holes 113 of the housing 11 as shown in FIG. 5 and FIG. 6A.

(Process 2)

In the second process, the PCB 2 having the pattern-type connection terminal 22 formed on the upper surface is fastened to the lower casing 100B by bolts. Here, the PCB 2 includes the cut slits 23A and 23B as shown in FIG. 6B.

(Process 3)

In the third process, the connector assembly 1 is connected to the lower casing 100B. More specifically, the airtight protrusion 4 of the lower casing 100B is inserted in the airtight groove portion 141 of the sealing member 14 that is connected to the housing 11. Also, the front and rear protrusions 142 and 142A of the sealing member 14 are inserted respectively in the front and rear recesses 5 and 5A formed at the lower casing 100B.

Next, the housing 11, together with the PCB 2, is fastened to the lower casing 100B through the fastening hole 3A which is formed in the mounting part 3 of the housing 11. Here, the housing legs 112 and 112A are inserted in the cut slits 23A and 23B, formed at the PCB 2, and guided to the mounting position of the PCB 2 in a sliding manner.

In addition, by the elastic supporting part 130, the contact terminal 13A and the ground terminal 123A of the housing 11 are elastically brought into contact with the pattern-type connection terminal 22 formed at the upper surface of the PCB 2 (refer to FIG. 6B and FIG. 7A).

(Process 4)

Figure 7B:
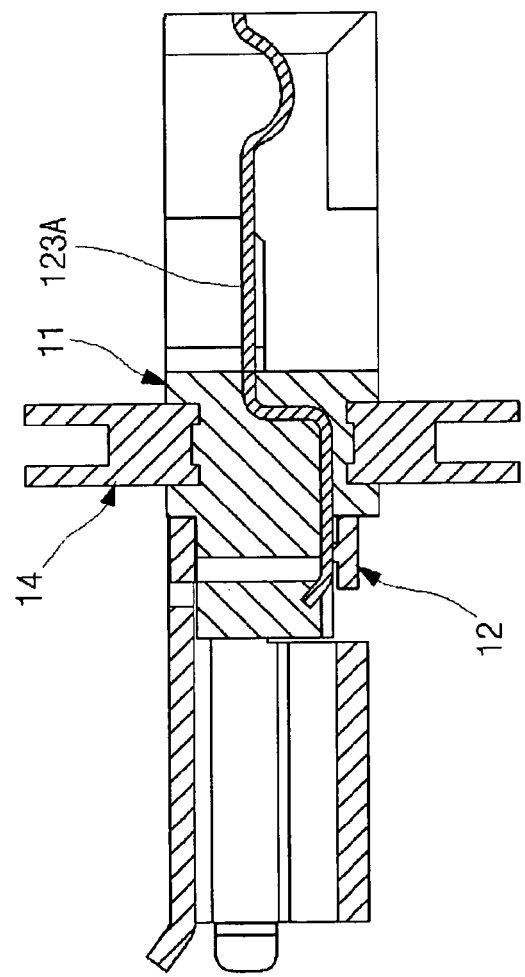

In the fourth process, the upper and lower casings 100A and 100B are connected to each other. In the same manner as in the third process, the airtight protrusion 4 of the upper casing 100A is inserted in the airtight groove portion 141 of the sealing member 14 connected to the housing 11. Additionally, the front and rear protrusions 142 and 142A of the sealing member 14 are inserted respectively into the front and rear recesses 5 and 5A which are formed at the upper casing 100A. In this state, the upper and lower casings 100A and 100B are connected to each other as shown in FIG. 7A and FIG. 7B.

Figure 8:
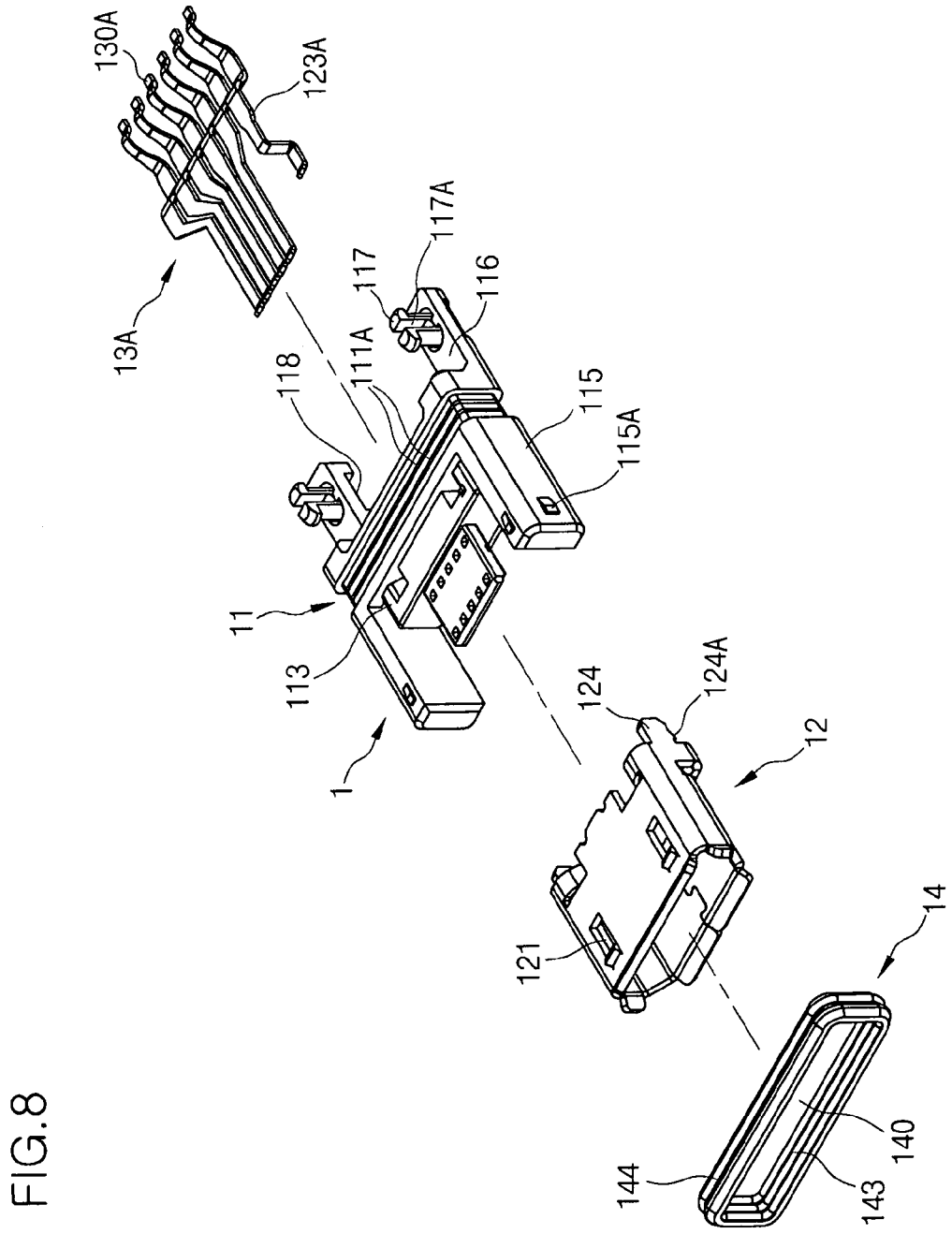

FIGS. 8 through 12 illustrate the waterproofing structure according to the third embodiment of the present invention. Notably, FIG. 8 is an exploded perspective view of the structure.

Referring now to FIG. 8, in the same manner as in the first and the second embodiments, the waterproofing structure includes the housing 11, the shell 12 and the sealing member 14. The housing 11 further includes the contact terminal 13A that has an elastic contacting part 130A formed upwardly and the ground terminal 123A, both of which are integrally formed by injection molding with the housing 11. Pairs of parallel arms 115 and backward protrusions 116 are integrally formed with the front and the rear of the housing 11, respectively. Furthermore, a locking hook 117 is integrally formed with each of the backward protrusions 116. The locking hook 117 is resilient by the existence of a cut recess 117A formed on an upper surface of the backward protrusion 116 and opened upward. The backward protrusion 116 further includes a connector fixing recess 118 formed at a lower part thereof.

In the housing 11, the sealing member-receiving groove 111 is formed between the arms 115 and the backward protrusions 116. The sealing member-receiving groove 111 includes at least two airtight annular protrusions 111A. The arms 115 each include a movement prevention protrusion 115A formed at upper and lower sides and one lateral side thereof. Additionally, a pair of the mounting holes 113 are formed respectively on both sides of the front of the housing 11, adjacent to the arms 115.

The shell 12 includes the fixing holes 121, each formed on the upper surface thereof, and a pair of the fixing pieces 124 that are formed at both rear sides thereof, to be inserted in the mounting holes 113 of the housing 11. The fixing piece 124 is formed with a fixing protrusion 124A at a lower end thereof.

The sealing member 14 includes the penetration hole 140 formed in the center, and further includes an airtight annular groove 143 formed on an inner surface thereof, to insert the airtight annular protrusion 111A of the housing 11. Additionally, an annular groove 144 is formed at the outer surface of the sealing member 14, thereby sectioning the sealing member 14 into front and rear parts. Thus, the sealing member 14 is configured into a double airtight structure.

Figure 9:
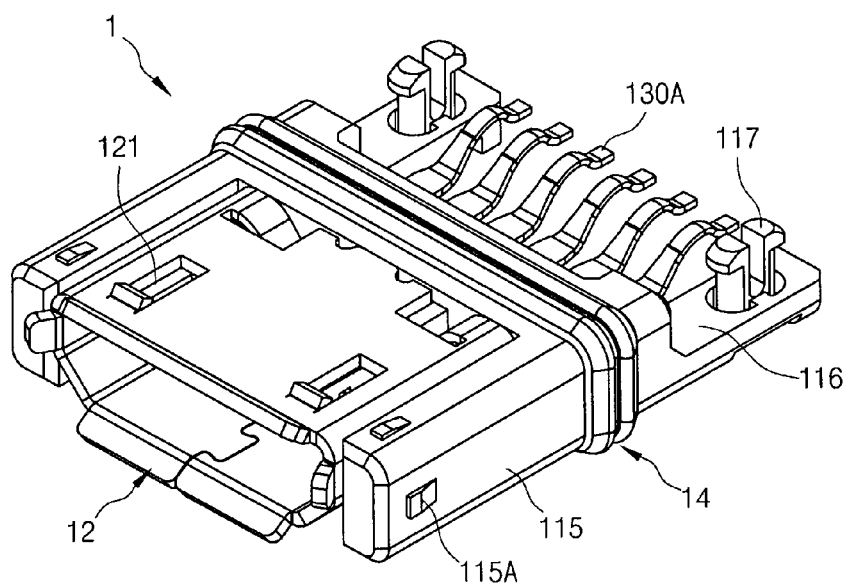

FIG. 9 is a perspective view of a connector assembly according to the third embodiment of the present invention.

As shown in FIG. 9, the contact terminal 13A and the ground terminal 123A are integrally formed with the housing 11 by injection molding, to be inserted in the housing 11. The shell 12 is constructed by inserting the fixing pieces 124 formed at the both rear sides in the mounting holes 113 of the housing 11. As the sealing member 14 is fitted with the sealing member-receiving groove 111 of the housing 11, the connector assembly 1 is constructed.

Figure 10:
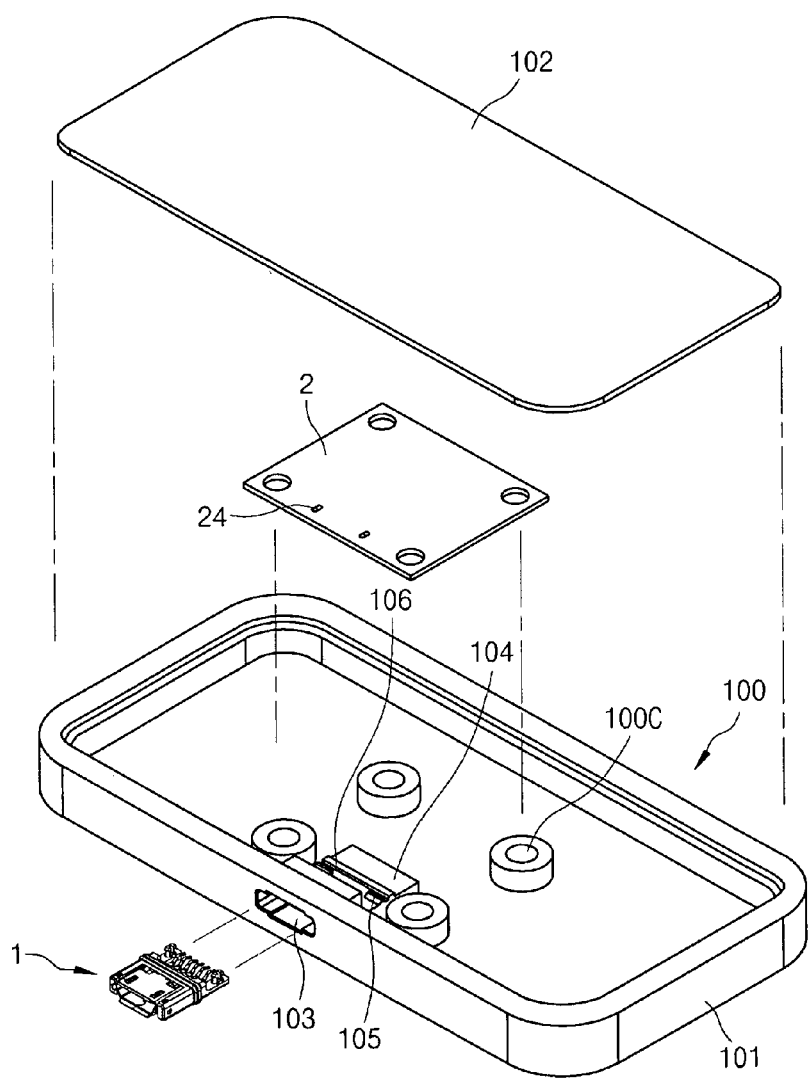

A main body 100 of the mobile phone according to the third embodiment, as shown in FIG. 10, comprises a casing main body 101 opened upward and a casing cover 102 connected to the opened side of the casing main body 101. At one side of the casing main body 101, a connector insertion passageway 103 is formed to insert the connector assembly 1 therethrough, being extended inwardly of the casing main body 101.

A connector lower part supporter 104 is formed at the rear lower part of the connector insertion passageway 103 in the casing main body 101, being integrally formed with the inside of the casing main body 101. The connector lower part supporter 104 includes a connector fixing rib 105 and a sliding prevention stopper 106 formed on an upper surface thereof. In addition, on a bottom surface of the casing main body 101, the fixing boss 100C is integrally formed to mount the PCB 2 through bolt connection.

Also, the PCB 2 comprises fixing holes 24 for inserting the locking hooks 117 formed at the backward protrusion 116 of the housing 11.

The above structured third embodiment of the present invention is capable of obtaining the waterproof function through the following processes, which will be described in detail with reference to FIG. 9 through FIG. 11C.
(Process 1)

In the first process, the main body 100 of the mobile phone is molded to consist of the casing main body 101 opened upward, including the connector insertion passageway 103 at one side thereof, and the casing cover 102 outfitted to fit the casing main body 101, as shown in FIG. 10.
(Process 2)

As shown in FIG. 9, the housing 11 is connected with the shell 12 at the front thereof and inserted with the contact terminal 13A and the ground terminal 123A. The sealing member 14 is fitted with the outside of the above structured housing 11, accordingly completing the connector assembly 1. The fixing pieces 124 of the shell 12 are inserted in the mounting holes 113 of the housing 11, and then fixed by the fixing protrusion 124A.

Next, the sealing member 14 is mounted in the sealing member-receiving groove 111 of the housing 11 through the penetration hole 140. Here, the airtight annular protrusion 111A of the sealing member-receiving groove 111 is inserted in the airtight annular groove 143 formed on the inner surface of the sealing member 14.
(Process 3)

Figure 11A:
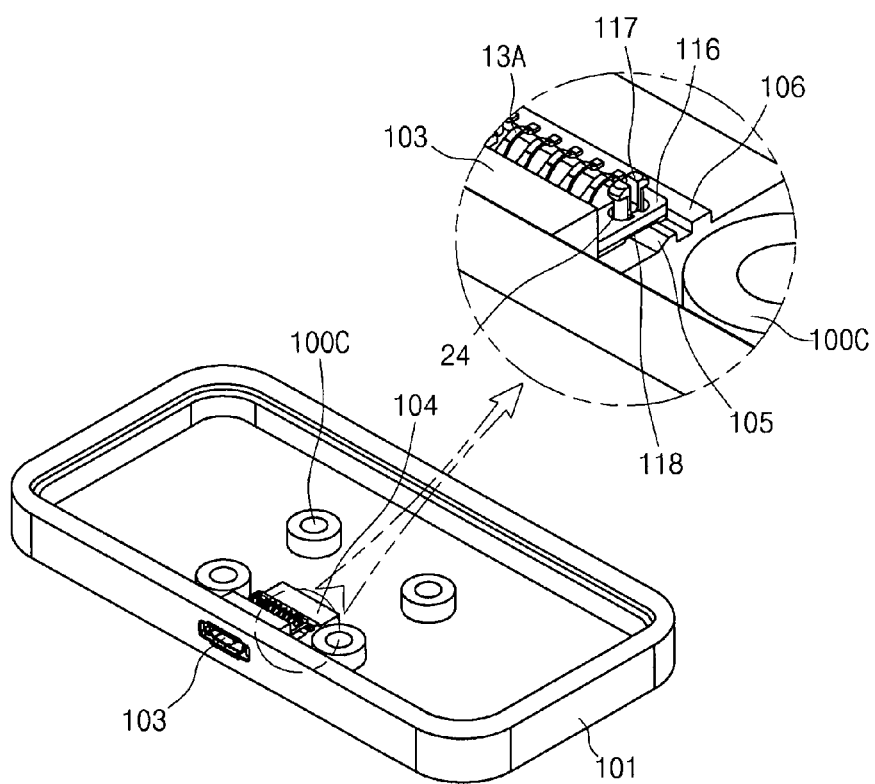
FIG. 11A, FIG. 11B, and FIG. 11C are perspective views showing constructing processes of the waterproof structure according to the third embodiment of the present invention.
Figure 11B:
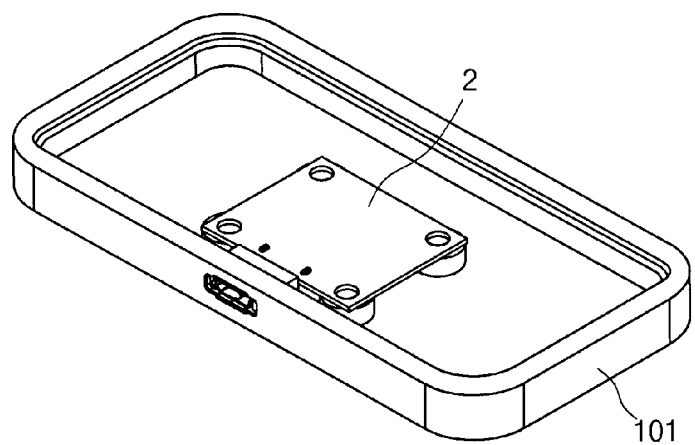

The connector assembly 1 is inserted through the connector insertion passageway 103 of the casing main body 101, as shown in FIG. 11A. After that, the PCB 2 is inserted into the rear part of the housing 11, which protrudes inwardly from the casing main body 101, such that the contact terminal 13A and the ground terminal 123A are resiliently brought into contact with the pattern-type connection terminal 22 that is formed at the lower surface of the PCB 2. Simultaneously, the PCB 2 is connected to the casing main body 101 using bolts.

More specifically, the connector assembly 1 is first inserted through the connector insertion passageway 103 of the connector main body 101. Here, since an outer circumference of the sealing member 14 connected to the housing 11 is greater than an inner circumference of the connector insertion passageway 103, the connector assembly 1 is forcedly fitted with the connection insertion hole 103. In addition, as the movement prevention protrusion 115A of the arm 115 is brought into contact with an inner wall of the connector insertion passageway 103, the housing 11 can be prevented from moving.

The connector fixing recess 118, formed at the lower part of the backward protrusion 116 of the housing 11, is engaged with the connector fixing rib 105 that is formed on the connector lower part supporter 104 within the casing main body 101. An end of the backward protrusion 116 is caught by the sliding prevention stopper 106, which is disposed near the rear part of the connector fixing rib 105, thereby preventing the connector assembly 1 from being inserted or slid in through connector insertion passageway 103.

Furthermore, after the connector assembly 1 is inserted through the connector insertion passageway 103 of the casing main body 101, the fixing hole 24 formed at the PCB 2 is engaged with the locking hook 117 of the backward protrusion 116 of the connector assembly 1. Here, as the resilient locking hook 117 is temporarily compressed at the beginning of connection with the fixing hole 24 and then restored to the initial state, connection between the PCB 2 and the connector assembly 1 is achieved.

(Process 4)

Figure 11C:
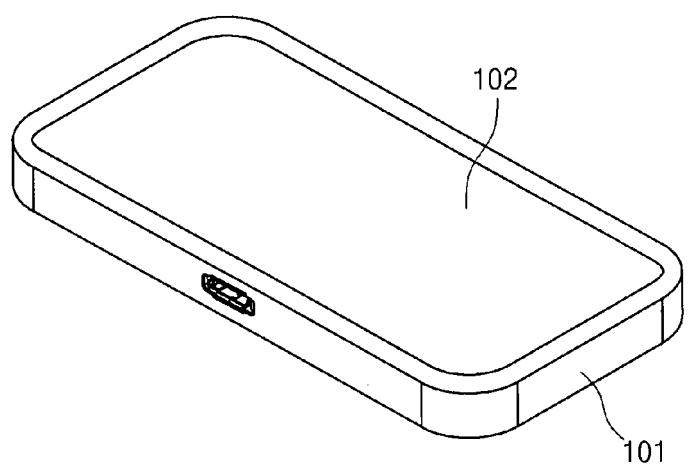
Figure 12:
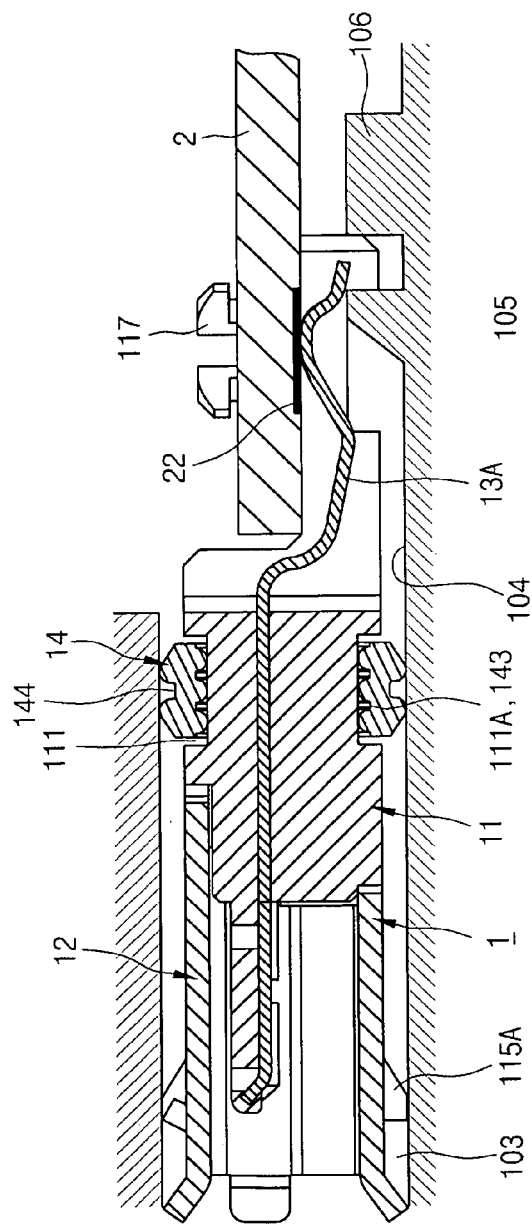

As shown in FIG. 11C, the casing cover 102 is connected to the opened side of the casing main body 101, thereby shielding the inside of the casing main body 101 from the outside. A general sealing material (not shown) may be interposed for connection between the casing main body 101 and the casing cover 102. According to this, airtightness between the casing main body 101 and the casing cover 102 can be secured.

As described above, according to the third embodiment of the present invention, the main body 100 of the mobile phone includes the casing main body 101 having an open upper side, and the casing cover 102. Also, by providing the connector insertion passageway 103 at one side of the casing main body 101, the connector assembly 1 can be connected through the connector insertion passageway 103. Therefore, although the first and the second embodiments of the present invention may cause entry of water through the gap between the upper and lower casings, because the main body 100 includes the separable upper and lower casings, the entry of water can be prevented according to the third embodiment.

Moreover, according to the third embodiment of the present invention, the plurality of airtight annular protrusions 111A, provided at the sealing member-receiving groove 111 of the housing 11, are insertedly engaged with the airtight annular grooves 143 formed on the inner surface of the penetration hole 140 of the sealing member 14. As a result, not only airtightness between the housing 11 and the sealing member 14 is guaranteed, but also the PCB 2 can be connected to the housing 11 without bolts.

As can be appreciated from the above description, the waterproofing method and structure according to the embodiments of the present invention are capable of preventing damage of an inner circuit structure of a main body of a mobile phone in situations where water enters through a recharging connector of the mobile phone, and accordingly improving the reliability and the quality of the mobile phone.

In addition, since a contact terminal of the recharging connector can be connected to a connection terminal of a PCB without soldering, a rubber sealing member mounted for a waterproofing effect to the recharging connector can be prevented from being deformed or damaged by heat generated from the soldering.

According to the embodiments of the present invention, even when the connection terminal of the PCB is formed simply as a pattern on the PCB, rather than as a separate part, the contact terminal of the recharging connector can be closely connected with the PCB. Therefore, the structure can be simplified.

Since the recharging connector, in the form of a connector assembly can be guided to a mounting position at the PCB in a sliding manner, convenience and rapidness of the assembling process can be enhanced, also improving the productivity.

By omitting a ground terminal from a shell and inserting the ground terminal in a housing along with the contact terminal, loss of a waterproof function of a sealing member, which is caused when the ground terminal is disposed ahead of the sealing member in the conventional structure, can be prevented.

Since the main body, according to the embodiments of the present invention, is constituted by a casing main body and a casing cover, and a connector insertion passageway is formed at the casing main body, entry of water occurring in the conventional main body having the separable upper and lower casings can be prevented.

In addition, a plurality of airtight annular protrusions are formed at a sealing member-receiving groove of the housing whereas airtight annular grooves are formed to be correspondingly engaged with the airtight annular protrusions. Accordingly, not only a waterproof effect can be obtained, but also the PCB can be connected to the housing without bolts. As a result, convenience of the assembling process can be enhanced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A waterproofing structure for a mobile phone, comprising:
   a casing main body including a casing cover connected at an opened upper side thereof and a connector insertion passageway formed at one side thereof;
   a connector assembly inserted from outside the casing main body through and into the connector insertion passageway formed on the casing main body, including a housing in which a contact terminal and a ground terminal are insert-molded, a sealing member mounted to the outside of the housing along a sealing member receiving groove disposed thereon, and a shell connected to the front of the connector assembly; and
   a printed circuit board formed with a pattern-type connection terminal formed on a bottom surface thereof for contact with the contact terminal and the ground terminal of the housing, fixedly fastened to a fixing boss formed inside the casing main body, and fitted with the rear part of the housing;
   wherein a leading end of the ground terminal contacts a lower inner surface of the shell;
   wherein the sealing member receiving groove of the housing includes at least two airtight annular protrusions while the sealing member comprises airtight annular grooves formed on an inner surface thereof to insert the airtight annular protrusions, and
   wherein an outside of the sealing member is sectioned by an annular groove so that the sealing member has a double airtight structure.

2. The waterproofing structure according to claim 1, wherein a pair of backward protrusions are formed at the rear part of the housing and locking hooks are integrally formed with upper parts of the backward protrusions to have elasticity by existence of a cut recess, whereas fixing holes for inserting the locking hooks are formed at the PCB, such that the housing and the PCB can be connected to each other through the locking hooks and the fixing holes.

3. The waterproofing structure according to claim 2, wherein the casing main body includes a connector lower part supporter integrally formed with a rear lower part of the connector insertion passageway, and the connector lower part supporter further includes a connector fixing rib formed at an upper surface thereof for engagement with a connector fixing recess formed at a lower surface of the backward protrusion of the housing, and a sliding prevention stopper supporting an end of the backward protrusion.

4. The waterproofing structure according to claim 1, wherein the housing includes a pair of arms integrally formed at both front sides thereof, the arms each including a movement prevention protrusion formed at upper and lower sides and one lateral side, and the shell includes a pair of fixing pieces integrally formed with both rear sides thereof and inserted in mounting holes formed at both front sides of the housing, the fixing pieces each including a fixing protrusion at a lower part thereof.

* * * * *